(12) United States Patent
Bejeryd et al.

(10) Patent No.: US 9,709,395 B2
(45) Date of Patent: Jul. 18, 2017

(54) METHOD AND SYSTEM FOR ANALYZING IMAGES FROM SATELLITES

(71) Applicant: VRICON SYSTEMS AKTIEBOLAG, Linkoeping (SE)

(72) Inventors: Johan Bejeryd, Linkoeping (SE); Johan Borg, Linkoeping (SE); Folke Isaksson, Linkoeping (SE); Leif Haglund, Brokind (SE); Per Carlbom, Linkoeping (SE); Ola Nygren, Linghem (SE); Ingmar Andersson, Linkoeping (SE)

(73) Assignee: VRICON SYSTEMS AKTIEBOLAG, Linkoeping (SE)

( * ) Notice: Subject to any disclaimer, the term of this patent is extended or adjusted under 35 U.S.C. 154(b) by 0 days.

(21) Appl. No.: 13/866,203

(22) Filed: Apr. 19, 2013

(65) Prior Publication Data
US 2014/0314307 A1 Oct. 23, 2014

(51) Int. Cl.
*G01C 11/34* (2006.01)
*G06T 7/80* (2017.01)
*G06T 7/55* (2017.01)
*G06T 7/593* (2017.01)

(52) U.S. Cl.
CPC ............... *G01C 11/34* (2013.01); *G06T 7/55* (2017.01); *G06T 7/593* (2017.01); *G06T 7/80* (2017.01); *G06T 2207/10032* (2013.01); *G06T 2207/20088* (2013.01)

(58) Field of Classification Search
None
See application file for complete search history.

(56) References Cited

U.S. PATENT DOCUMENTS

| 5,550,937 | A  | * | 8/1996  | Bell        | G06T 3/0081 |
|           |    |   |         |             | 382/278     |
| 2011/0090337 | A1 | * | 4/2011  | Klomp et al. | 348/144 |
| 2014/0300736 | A1 | * | 10/2014 | Reitinger    | G06T 7/002 |
|           |    |   |         |             | 348/144 |

OTHER PUBLICATIONS

Madsen, Kaj, Hans Bruun Nielsen, and Ole Tingleff. "Methods for Non-Linear Least Squares Problems." (2004).*
Raggam, Hannes. "Surface Mapping Using Image Triplets." Photogrammetric Engineering & Remote Sensing 72.5 (2006): 551-563.*

(Continued)

*Primary Examiner* — Chan Park
*Assistant Examiner* — Geoffrey E Summers
(74) *Attorney, Agent, or Firm* — Alston & Bird LLP

(57) ABSTRACT

A method is provided, which comprises generating at least three images of an area of interest from at least one imaging system, the generated images being provided from at least three different angles, establishing point correspondence between the provided images. The method further involves generating at least two sets of three-dimensional information based on the provided images, wherein the at least two sets of three-dimensional information are generated based on at least two different combinations of at least two of the at least three provided images of the area of interest. The method further includes comparing the at least two sets of three-dimensional information so as to determine discrepancies, and providing information related to the imaging system or errors in the images based on the determined discrepancies.

16 Claims, 4 Drawing Sheets

(56) References Cited

OTHER PUBLICATIONS

Lankton, Shawn. "3D Vision with Stereo Disparity." Shawn Lankton Online. N.p., Dec. 19, 2007. Web. Jan. 27, 2015.*
Diner, David J., et al. "Multi-angle Imaging SpectroRadiometer (MISR) instrument description and experiment overview." Geoscience and Remote Sensing, IEEE Transactions on 36.4 (1998): 1072-1087.*
European Patent Office, Extended European Search Report for Application No. 13882584.9, Dec. 8, 2016, 12 pages, Germany.
Kim, Taemin, et al., "Robust Mosaicking of Stereo Digital Elevation Models from the Ames Stereo Pipeline", *Advances in Visual Computing*, Nov. 29, 2010, pp. 283-291, Springer, Germany.
Triggs, Bill, et al., "Bundle Adjustment—A Modern Synthesis", *Proceedings of Vision Algorithms '99 Workshop associated with $7^{th}$ IEEE International Conference on Computer Vision*, Sep. 21-22, 1999, pp. 298-372, Springer-Verlag LNCS 1883, Germany.
Xiong, Zhen, et al., "Bundle Adjustment with Rational Polynomial Camera Models Based on Generic Method", *IEEE Transactions on Geoscience and Remote Sensing*, Jan. 2011, pp. 190-202, vol. 49, No. 1, IEEE, U.S.A.

\* cited by examiner

METHOD AND SYSTEM FOR ANALYZING IMAGES FROM SATELLITES

BACKGROUND

Technical Field

The present invention relates to a method for analyzing images generated from at least one imaging system on at least one satellite, a method for image correction, a method for providing a three-dimensional image, a method for generating a 3D model of the environment, a computer program, a computer program product and a system for performing any of the methods.

Related Art

When images are taken by an imaging system on a satellite it is desirable to get as accurate images as possible, i.e. the final images should give a picture of the area or scenery which is as close to reality as possible. This could, for example, be that geometric shapes on the ground correspond to the same geometric shapes in the image, or that distances between objects in the image correspond to the distance in reality. For achieving this, usually some correction of the images provided by the imaging system is needed. This correction can be performed either in the imaging system at the satellite or in the images at any later stage, for example by computers on the ground.

One of the reasons why corrections are needed is that internal and/or external parameters of the imaging system might change over time, for example, due to the rough conditions when launching the satellite, due to degradations in the system, due to temperature changes, and/or due to imperfections in measuring or controlling devices. This might, for example, affect lenses, sensors or any other equipment onboard the satellite.

In some satellites, sensors are staggered and might partially overlap. Then some image processing is needed to compensate for the different positions of the sensors and to provide one image out of the signals received by the several sensors. This image processing, among other things, takes care of the relative position and of the relative orientations of the sensors. Also the relative position and the relative orientation of the sensors can change over time.

Another reason for the need of corrections are imperfections in external data used to rectify raw data of a satellite. This can, for example, be imperfections in an elevation model used to combine data from staggered sensors to arrive at a provided image from a satellite.

Due to weight, space and/or power constraints on satellites it is often not practical to add extra equipment on satellites for monitoring changes of sensors or parameters in imaging systems. Instead, one usually first builds a model of how different changes of parameters or components of the imaging system influence images provided by the imaging system. Then, for example, images are taken by the imaging system of areas where so-called ground control points (GCP) are known or could be measured via surveying, and an equation system will be solved where GCP enter as known quantities, so that after solving of the equation system GCP in the imaging correspond as close as possible to the respective position of the GCP in reality. The equation system will then provide new values for parameters of the imaging system and/or for the orientation and relative position of sensors or other components therein. These new parameters can then be used in imaging processing/correction of further images.

BRIEF SUMMARY

One object of the invention is to provide a method for analysis and/or correction of satellite images which does not need ground control points.

The analysis is in one example performed by a method according to claim 1. By providing at least three images of an area from different angles and by establishing point correspondence between the at least three provided images one is able to generate at least two sets of three-dimensional information. Here, and in the whole document, the term establishing point correspondence comprises establishing point correspondence and/or the case of establishing, at least partially, pixel correspondence. Here, and in the whole document, the term providing an image does relate to both providing actual images, but also to providing raw data which is convertible into images, without actually doing the conversion. Both cases should therefore be treated as being part of the present invention. Here, and in the whole document, the terms image and imaging system do relate to both images which are provided by imaging systems which work on visible light, but also images which are provided by imaging system which are not, or, at least, not only working with visible light, such as infrared imaging systems, ultraviolet imaging systems or multispectral sensor imaging systems. All cases should therefore be treated as being part of the present invention. When referring to the term images of an area of interest, the term should be interpreted, here and in the whole document, as that the area of interest is the overlapping part of the images. It is essential that the overlapping part is not an empty set. The at least two sets of three-dimensional information are generated by combining at least two different combinations of at least two images out of the at least three images. Then the at least two sets of three-dimensional information are compared. By looking at discrepancies between the at least two sets of three-dimensional information one gains finally information related to the imaging system and/or errors in the images. If there are discrepancies between the at least two sets of three-dimensional information these discrepancies can be used to gain additional information related to the imaging system and/or errors in the images. If there are no discrepancies between the at least two sets of three-dimensional information the images will not need any error corrections and information one already has about the imaging system will not need to be updated based on the at least two sets of three-dimensional information. The additional information related to the imaging system and/or the errors in the image can be used so as to provide high accuracy images.

In one example the method comprises the additional step of building a model with internal and/or external parameters of the at least one imaging system. The model will include how these parameters affect images which are provided by the at least one imaging system. These internal and/or external parameters can be comprised in the information related to the imaging system. Performing the method will then result in getting updated values and/or error estimates for the values of these parameters. In one example the term internal parameters comprises, here and in the whole document, intrinsic parameters of the imaging system. One example of an intrinsic parameter is the field of view of the imaging system.

In one example the method is used for image correction and further comprises the step of changing parameters of the at least one imaging system based on the result of the analysis of possible differences between the at least two sets of three-dimensional information. Further, it comprises the step of correcting at least one of the at least three provided images of the area of interest which are taken from the at least one imaging system according to the built model. In one example, it also comprises the step of regenerating the at least two sets of three-dimensional information from the corrected at least three pictures. The correction of the at least one of the at least three provided images is performed so as to minimize any errors in the point correspondence between the at least three pictures and/or as to minimize the differences in the at least two generated sets of three-dimensional information.

In one example the steps of changing parameters of the at least one imaging system, correcting at least one of the at least three provided images, and, if performed, regenerating the at least two sets of three-dimensional information are repeated until the errors in the point correspondence between the at least three pictures and/or the differences between the at least two generated sets of three-dimensional information are below a certain threshold, or until a certain number of iterations has been performed.

In one example at least some of the parameters of the at least one imaging system are independent for every provided image.

In one example at least some of the parameters of the at least one imaging system will take the same value for at least some provided images.

In one example at least some of the provided images are provided from different satellites.

In one example the at least two sets of three-dimensional information comprise three-dimensional points, and/or three dimensional areas, and/or three-dimensional images. In one example the three-dimensional points in a set of three-dimensional information comprise a point-cloud generated from the points in at least two of the at least three provided images for which point-correspondence has been established.

In one example the step of providing at least three images of an area of interest from the at least one imaging system comprises selecting a set of at least three images captured by means of the at least one imaging system, said captured images covering the area of interest.

In one example the step of providing at least three images comprises performing, for each image, image processing and/or image manipulation and/or other calculations and/or data processing and/or other data manipulation to arrive at the provided image. By doing this, the methods described in this document can not only be applied to raw data of an imaging system, but also to images which already are processed/manipulated. This might be useful when a user gets images from a provider of satellite images without having access to the raw data from a satellite.

In one example a method for providing a three-dimensional image of an area of interest is disclosed. This method comprises the steps of analyzing images generated from at least one imaging system on at least one satellite according to the above and providing the three-dimensional image of the area of interest based on the images and based on the provided information related to the imaging system and/or errors in the images. By doing this, the three-dimensional image will get more accurate than in the case when a three-dimensional image is not based on the provided information related to the imaging system and/or errors in the images.

In one example a 3D model of an environment is generated. This example comprises combining three-dimensional images provided in accordance with the method for providing a three-dimensional image of an area as disclosed above.

One embodiment of the present invention also relates to a computer program comprising a program code for analyzing images generated from at least one imaging system on at least one satellite, comprising the steps of: providing at least three images of an area of interest from the at least one imaging system, the at least three provided images being provided from at least three different angles; establishing point correspondence between the at least three provided images; generating at least two sets of three-dimensional information based on the at least three provided images, wherein the at least two sets of three-dimensional information are generated based on at least two different combinations of at least two of the at least three provided images of the area of interest; comparing the at least two sets of three-dimensional information so as to determine discrepancies; and providing information related to the imaging system and/or errors in the images based on the determined discrepancies.

One embodiment of the present invention also relates to a computer program comprising a program code for correcting images generated from at least one imaging system on at least one satellite, comprising the steps of analyzing images, building a model with internal and/or external parameters of said at least one imaging system and how these parameters affect images provided by said at least one imaging system, changing parameters of said at least one imaging system based on the result of the analysis of possible differences between the at least two sets of three-dimensional information, correcting at least one of the at least three provided images of the area of interest taken from said at least one imaging system according to the built model, and, preferably, regenerating the at least two sets of three-dimensional information from the corrected at least three pictures, wherein the correction is performed so as to minimize any errors in the point correspondence between the at least three pictures and/or as to minimize the differences in the at least two generated sets of three-dimensional information.

One embodiment of the present invention also relates to a computer program product comprising a program code stored on a computer readable media for analyzing images generated from at least one imaging system on at least one satellite comprising the steps of: providing at least three images of an area of interest from the at least one imaging system, the at least three provided images being provided from at least three different angles; establishing point correspondence between the at least three provided images; generating at least two sets of three-dimensional information based on the at least three provided images, wherein the at least two sets of three-dimensional information are generated based on at least two different combinations of at least two of the at least three provided images of the area of interest; comparing the at least two sets of three-dimensional information so as to determine discrepancies; and providing information related to the imaging system and/or errors in the images based on the determined discrepancies.

One embodiment of the present invention also relates to a computer program product comprising a program code stored on a computer readable media for correcting images generated from at least one imaging system on at least one satellite, comprising the steps of analyzing images, building a model with internal and/or external parameters of said at least one imaging system and how these parameters affect images provided by said at least one imaging system, changing parameters of said at least one imaging system based on the result of the analysis of possible differences between the at least two sets of three-dimensional information, correcting at least one of the at least three provided images of the area of interest taken from said at least one imaging system according to the built model, and, preferably, regenerating the at least two sets of three-dimensional information from the corrected at least three pictures, wherein the correction is performed so as to minimize any errors in the point correspondence between the at least three pictures and/or as to minimize the differences in the at least two generated sets of three-dimensional information.

A system for analyzing images generated from at least one imaging system on at least one satellite according to one embodiment of the present invention comprises memory means arranged to store at least three images of an area of interest from the at least one imaging system, the at least three provided images being provided from at least three different angles, and a processing unit arranged to establish point correspondence between the at least three provided images, generate at least two sets of three-dimensional information based on the at least three provided images, wherein the at least two sets of three-dimensional information are generated based on at least two different combinations of at least two of the at least three provided images of the area of interest, compare the at least two sets of three-dimensional information so as to determine discrepancies and providing information related to the imaging system and/or errors in the images based on the determined discrepancies.

A system for correcting images generated from at least one imaging system on at least one satellite according to one embodiment of the present invention comprises the components of the system for analyzing images generated from at least one imaging system on at least one satellite, where the processing unit is further arranged to change parameters of said at least one imaging system based on the result of the analysis of possible differences between the at least two sets of three-dimensional information, and to correct at least one of the at least three provided images of the area of interest taken from said at least one imaging system according to a built model with internal and/or external parameters of said at least one imaging system and how these parameters affect images provided by said at least one imaging system.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

FIG. 6 shows a schematical sensor arrangement on a satellite, of which FIG. 5 is a detailed view.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Figure 1:
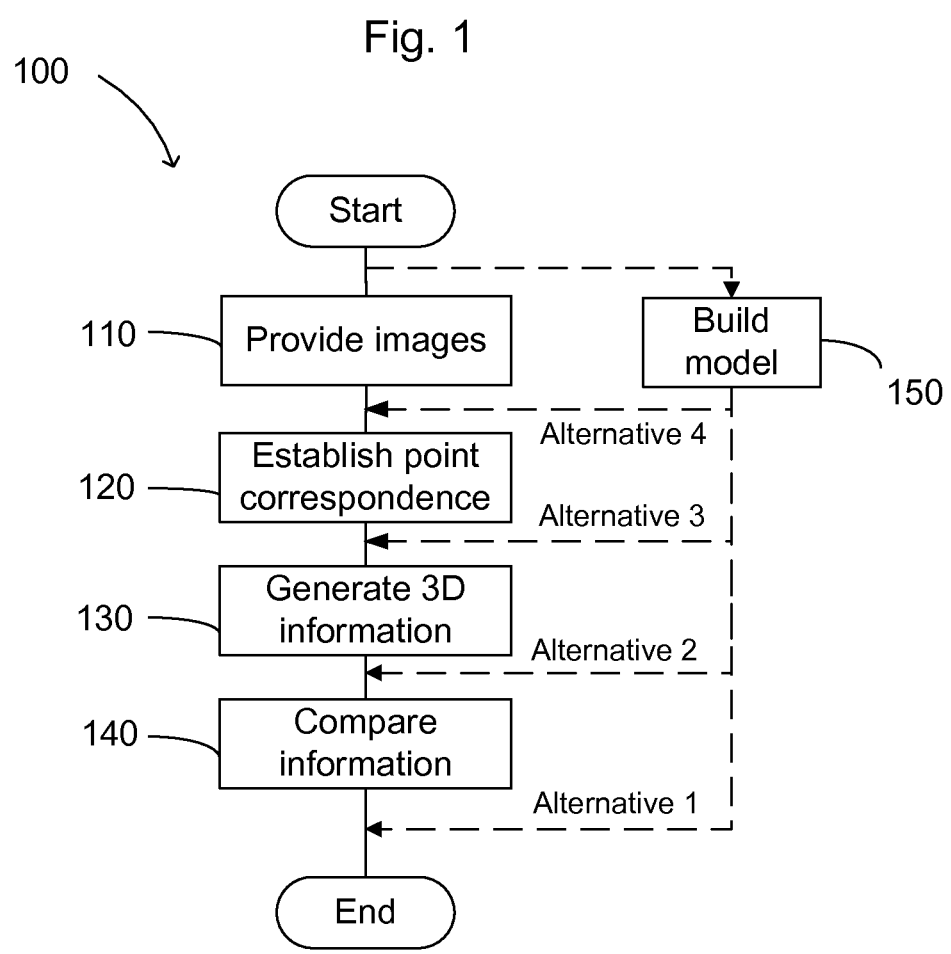
FIG. 1 shows a flow chart of a method for analyzing images according to one example the invention.

In FIG. 1 a flow chart is shown for a method 100 for analyzing images. After the start, the method starts with step 110.

In step 110 at least three images of an area of interest are provided. The images can show larger areas than the area of interest, but each of the at least three images has to cover at least the area of interest. In one example, images showing larger areas than the area of interest are limited to the part of the images only showing the area of interest. This might save computing time for the method and/or storing space needed for the data representing the images and the data calculated during the method. The area of interest is in one example an area on the Earth's surface. The area of interest could be an area of arbitrary shape and does not to be connected. The at least three images have to be provided from at least three different angles. In one example more than three images are provided. The more than three images in one example are all provided from different angles. In an alternative example, some of the images may be provided from the same angle. In this example, however, the images still have to be provided from at least three different angles.

In one example the images are provided from the same satellite. In another example at least some of the images are provided from different satellites. In one example the image systems on the different satellites are different. There is no limit in within which time the images are provided. However, the scene in the area of interest should not change too much between the times when the images are provided. Changes in the scene of the area of interest comprise in one example one or more of constructing or destroying buildings, infrastructure or other constructions, and natural disasters, such as earthquakes, tsunamis, fires, etc. With a high similarity between the images the accuracy in establishing point correspondence in the next method step is increased.

In one example, the step of providing at least three images of an area of interest from the at least one imaging system comprises selecting a set of at least three images captured by means of the at least one imaging system, where the captured images cover the area of interest. The imaging system can be any kind of imaging system. It could comprise a camera, lenses, sensors, shutters, or any other elements known to those skilled in the art of constructing imaging systems on satellites.

The step of providing images includes in one example image processing and/or image manipulation and/or other calculations and/or data processing and/or other data manipulation to arrive at the provided image. In one example at least some of the images are provided, directly or indirectly, from a provider of images from satellites.

In one example the step of providing images comprises using the raw data provided directly from the satellite. It should be noted that is not absolutely necessary to convert the raw data into an image in this step. It is enough that the raw data is convertible to an image.

In one example the provided images contain metadata. In one example this metadata comprises internal and/or external parameters of the at least one imaging system. In one example this metadata comprises information about the sensors of the at least one imaging system. In one example the metadata comprises positioning data of the imaging system and/or angles for the orientation of the imaging system and/or time related to the image and/or the field of view of the imaging system. In one example the metadata comprises intrinsic parameters of the imaging system, like lens parameters. The method continues with step 120.

In step 120 point correspondence is established between the at least three provided images. Preferably point correspondence will only be done for points lying in the area of interest. This can be done by any method for finding point correspondence or point matching which is known to those skilled in the art, like feature point matching, e.g. SIFT or SURF, or pixel based matching, e.g. correlation- or phase-based techniques, or more global methods, e.g. graph cuts or mean field methods. The number of points for which point correspondence is established is an arbitrary positive integer. However, the more points are used, the more information can be provided for use in later steps 140. On the other hand, the number of points might be limited from above due to time constraints or due to constraints in computer power and using too many points may not give any further information worth the effort. The method continues with step 130.

In step 130 at least two sets of three-dimensional information are generated, based on the at least three provided images. The at least two sets of three-dimensional information are generated based on at least two different combinations of at least two of the at least three provided images of the area of interest. In one example, one set of the at least two sets of three-dimensional information is generated based on combining the first and the second image and another set of the at least two sets of three-dimensional information is generated based on combining the first and the third image. In one example a set of three-dimensional information comprises a set of three-dimensional points situated in the area of interest. Three-dimensional points are in one example points having three space coordinates. In one example the set of three-dimensional points corresponds to the points for which point correspondence has been established. This can, for example, be achieved via triangulation. In one example a set of three-dimensional information comprises a set of planes in three-dimensional space whose projection onto the Earth's surface is situated in the area of interest. In one example a set of three-dimensional information comprises a set of three-dimensional images situated in the area of interest.

In one example, the at least two sets of three-dimensional information correspond to each other. In one example, the sets correspond to the three-dimensional points for which point correspondence has been established. In one example, one of the sets corresponds to the three-dimensional points for which point correspondence has been established between a first and a second image of the at least three images and the other set corresponds to the three-dimensional points for which point correspondence has been established between a third and either the first or the second image of the at least three images. In case there would be no errors in the provided images of the area of interest and no errors in the process of establishing point correspondence and no errors in the process of generating the at least two sets of three-dimensional information, the at least two sets of three-dimensional information would be equal.

The at least two sets of three-dimensional information are in one example generated without the help of ground-control points (GCP). The position of the at least one satellite is in general known with high accuracy. Providing images from an area of interest with enough height difference and providing these images from different angles far enough apart, and knowing the position of the satellite, the field of view can be estimated with high accuracy. When knowing the position of the at least one satellite and its field of view one is then with the help of the at least three provided images able to calculate the height information and thus three-dimensional information without the help of GCP. The method continues with step 140.

In step 140, the at least two sets of three-dimensional information are compared. With no errors present in the previous steps of the method, the corresponding elements in the at least two sets will contain the same information. In one example, the corresponding elements are the three-dimensional points corresponding to the points, for which point correspondence has been established, and consequently the same information would be that the corresponding elements have the same coordinates in the at least two sets. If, however, there are any errors in the previous steps of the method, there might be discrepancies between the corresponding elements of the at least two sets. In one example, errors in the previous methods comprise at least some of misalignments in the at least one imaging system, errors in finding the correct point correspondence, and errors in generating the at least two sets of three-dimensional information. Misalignments in the at least one imaging system comprise in one example at least some of changed sensor position, changed sensor orientation. In one example, misalignments in the at least one imaging system comprise changed intrinsic parameters. Based on the determined discrepancies one is able to gain information related to the imaging system and/or errors in the images, i.e. the provided information. In one example, this is done via method step 150 which is performed at any time before step 140. Step 150 is further described later in this document. In one example, when there are no discrepancies, the provided information related to the imaging system and/or errors in the images is that no better, i.e. corrected, information can be obtained about the imaging system based on the comparison and/or that no errors can be corrected in the images based on the comparison. In one example, the latter might be the case because there are no errors. In one example, the method 100 of analyzing images ends after step 140. In another example, step 150 is performed at a later moment of time than step 140, as long as one does not need the built model of step 150 for providing information related to the imaging system and/or errors in the images in step 140. In case step 150 is performed after step 140, the method 100 ends after step 150.

In the optional step 150, a model is built with internal and/or external parameters of the at least one imaging system and how these parameters affect images provided by the at least one imaging system. In one example, these parameters comprise intrinsic parameters of the imaging system. In one example, these parameters comprise at least one of the relative orientation of one or more sensors in relation to possible other sensors or to the imaging system, the relative position of one or more sensors in relation to possible other sensors or the imaging system, the position of the imaging system, angles of the imaging system, for example the angles in relation to a positioning reference system, or any other, for example intrinsic, parameter, and the time when one or more sensors or a camera of the imaging system register light which forms the basis for a provided image. In one example, the model comprises how the parameters affect the images. In one example, the model comprises how the parameters affect the raw data which could be used to provide the images. In one example, the model comprises how the parameters affect points in the images which are used for establishing point correspondence. In one example, the model comprises how the parameters affect one or more of the at least two sets of three-dimensional information. The wording of how these parameters affect images should thus not exclude the possibility of performing the method directly on the raw data which would allow a conversion into an image, without actually converting it into an image. The wording of how these parameters affect images should neither exclude the possibility that the model might comprise how parts of an image, for example points for which points correspondence has been established, or information obtained based on the images or parts of the images, for example at least one of the at least two sets of three-dimensional information, are affected without actually including how the whole image itself is affected. When step 150 is performed before step 140, the provided information of step 140 comprises, in one example, new information about at least one of the internal and/or external parameters. In one example the new information comprises an updated value of a parameter and/or an error of a parameter.

The parameters of the imaging system are in one example assumed to have the same value for all images. In another example, at least some of the parameters are assumed to have different values for different images. This is not related to whether the images are provided from different satellites or not. Even when the images are provided from the same imaging system the values of the parameters for the imaging system providing different images can be different, for example, because the values of the parameters change over time. In one example, only some of the internal and/or external parameters of the at least one imaging system are assumed to have different values when providing the at least three images, whereas other internal and/or external parameters are assumed to have the same values when providing the at least three images.

In one example, building a model with internal and/or external parameters of the at least one imaging system comprises constructing an equation system, using the point correspondence, with the internal and/or external parameters of the at least one imaging system as variables.

In one example, the equation system is different for at least some of the provided images. In a preferred example, the number of internal and/or external parameters of the at least one imaging system is much lower than the number of points for which point correspondence has been established.

This model is in one example used in connection with performing one or more of the steps 120, 130 and 140. In one example the model is used when performing one or more steps of method 200, which is described in connection with FIG. 2.

Figure 2:
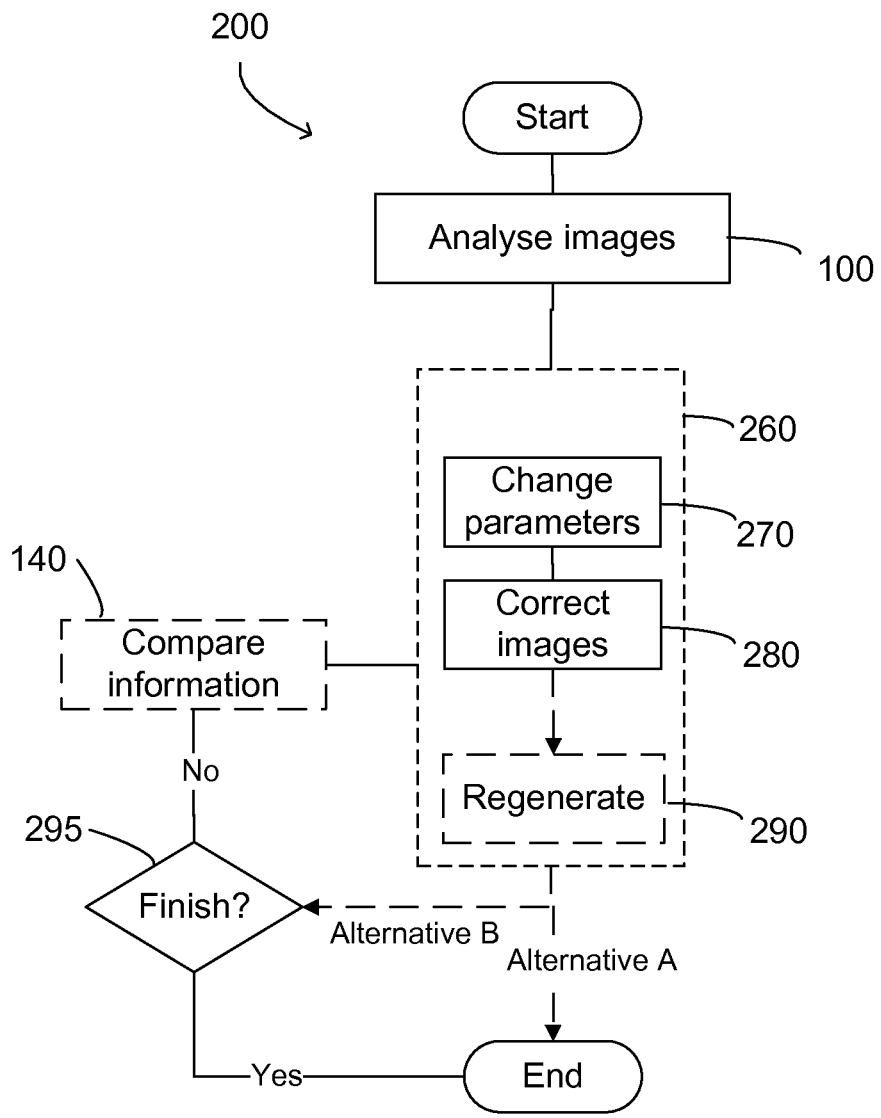
FIG. 2 shows a flow chart of a method for image correction according to one example of the invention.

In FIG. 2, a method 200 for correcting images is illustrated. The method starts with a step of analyzing images generated from at least one imagining system on at least one satellite. The analyzing comprises comparing at least two sets of three-dimensional information so as to determine discrepancies and providing information related to the imagining system and/or errors in the images based on the determined discrepancies wherein the at least two sets of three dimensional information are generated based on at least three provided images. In one example, the analyzing of images is performed in accordance with the method for analyzing images as described in relation to FIG. 1. After the step of analyzing 100, a step 260 comprising minimizing an error in point correspondence between the at least three images is performed.

In step 260 a correction is performed so as to minimize any errors in the point correspondence between the at least three images and/or as to minimize the differences in the at least two generated sets of three-dimensional information. In one example, the at least two generated sets of three-dimensional information correspond to the three-dimensional points corresponding to the points, for which point correspondence has been established, and minimizing the differences in the at least two generated sets of three-dimensional information corresponds to minimizing the differences of the coordinates between the corresponding points in the at least two generated sets of three-dimensional information. In one example, this minimization is done with help of the equation system described in connection with step 150. In one example, the equation system is overdetermined due to the fact that the number of points for which point correspondence has been established is higher than the number of internal and/or external parameters. In one example, the internal and external parameters are then numerically optimised so as to minimize the differences of the coordinates between the corresponding points in the at least two generated sets of three-dimensional information.

Step 260 comprises in one example performing of the consecutive steps 270, 280 and optionally 290. These steps will be described below in further detail.

In step 270, parameters of the at least one imaging system are changed based on the result of the analysis of possible differences between the at least two sets of three-dimensional information. In one example, said parameters correspond to the internal and/or external parameters of the imaging system which are comprised in the model which is built in relation to step 150 in FIG. 1. Said parameters comprise in one example at least one of the internal and/or external parameters described in relation to step 150 in FIG. 1. In one example, not all of the internal and/or external parameters are changed. In one example, information related to the imaging system provided by the comparison between the at least two sets of three-dimensional information comprises values for the parameters of the at least one imaging system. In the illustrated example, the comparison is provided as described in relation to step 140 in FIG. 1. After that the parameters are in step 270 changed to attain these values. The method continues with step 280.

In step 280, at least one of the at least three provided images of the area of interest taken from the at least one imaging system is corrected according to the changed parameters of the at least one imaging system. In one example this is done according to the built model. In one example, correcting the image comprises correcting the metadata connected to the image as described earlier. In one example, only the metadata or some part of the metadata of an image is corrected. In one example, only the raw data of an image is corrected.

In one example, step 260 is finished after performing step 280. In another example, step 290 follows after step 280. In step 290, the at least two sets of three-dimensional information are regenerated, now from the corrected at least three images. Step 290 is in one example performed in the same way as step 130. In another example, step 290 comprises performing a step in the same way as step 120 and 130.

In one example, the method finishes after performing step 260. In another example, the method continues with step 295.

In step 295, it is decided whether the errors in the point correspondence between the at least three pictures is below a certain threshold and/or whether the difference between the at least two generated sets of three-dimensional information is below a certain threshold, and/or whether step 260 has been performed a pre-determined number of times. If any of the aforementioned conditions is fulfilled the method stops. If none of the aforementioned conditions is fulfilled, the method continues with performing step 260 again. In one example, step 140 is performed before repeating step 260 again.

Figure 3:
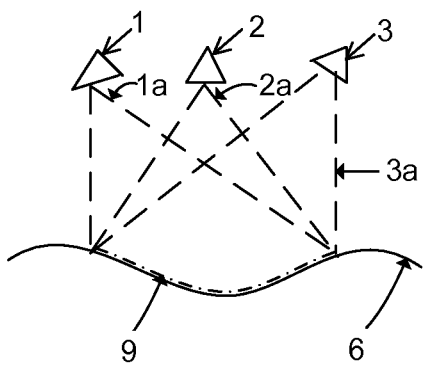
FIG. 3 shows schematically at least one satellite providing pictures of an area of interest from different angles.

FIG. 3 is an illustrative example of providing images and shows an example of how at least three images of an area of interest 9 can be provided. FIG. 3 is a schematic side-view, where the area of interest 9 is part of the Earth's surface 6. This is indicated by the dash-dotted line. The images provided from the at least one imaging system on the at least one satellite are provided from at least one satellite at positions 1, 2 and 3. In one example, the satellites 1, 2 and 3 are the same satellite and the images are provided when this satellite is at position 1, 2 and 3, respectively. In another example, the satellites 1, 2 and 3 are three different satellites which provide the image at the same or at different time. In yet another example, the satellites 1, 2 and 3 are two different satellite, where one of the two satellite provides the image from position 1, 2 or 3 and the other satellite provides the images from the other two positions. The satellites 1, 2, 3 have at least one imaging system with field of views 1a, 2a, 3a, respectively. The field of views 1a, 2a, 3a are oriented in such a way that the images provided from the respective imaging system are provided from different angles. The field of views 1a, 2a, 3a are oriented in such a way that the intersection between each of the field of view 1a, 2a, 3a and the Earth's surface 6 comprises the area of interest 9. In the example of FIG. 3 the intersection between the field of views 1a, 2a, 3a and the Earth's surface 6 is equal with the area of interest 9. However, this is only for illustrative purposes and not a prerequisite. In the example of FIG. 3 each of the field of views 1a, 2a, 3a intersects the Earth's surface 6 at the same points. However, this is only for illustrative purposes and not a prerequisite. The different angles from which the images are provided can take any values. However, in a preferred example the different angles differ by at least a few degrees. This will assure that images will show the area of interest from directions of view far enough away from each other to be able to construct reliable three-dimensional information out of them. The difference between the angles can take any value.

Figure 4:
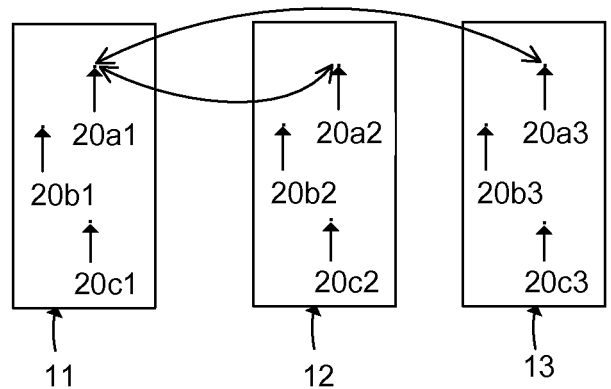
FIG. 4 shows schematically three images which were provided by an imaging system on a satellite.

FIG. 4 is an illustrative example of how point correspondence between 2D images may be established. It is a schematic view of the at least three provided images 11, 12, 13. In the example of FIG. 4 the three images 11, 12, 13 have the same size. This is, however, only for illustrative purposes. In the example of FIG. 4 each image shows the area of interest. If one of the images 11, 12, 13 would show more than the area of interest it would be enough to only consider the part of the image showing the area of interest. For a set of points 20a, 20b, 20c, . . . in the area of interest point correspondence is established between the corresponding points in each of the at least three images. This is for some points illustrated by the arrows between the points. In the example of FIG. 4, the set of points 20a, 20b, 20c, . . . has the corresponding points 20a1, 20b1, 20c1, . . . in image 11, the corresponding points 20a2, 20b2, 20c2, . . . in image 12 and the corresponding points 20a3, 20b3, 20c3, . . . in image 13. In this example the points 20a1, 20a2 and 20a3 correspond to each other, the points 20b1, 20b2 and 20b3 correspond to each other, the points 20c1, 20c2 and 20c3 correspond to each other, and so on. Since the images are taken from different angles and since there might be some errors in the process of providing the images, the points are, in general, not at exactly the same position in all the at least three images. The three images of FIG. 4 are only an illustrative example. In general, establishing point correspondence for more than three points is more advantageous for achieving better results in analyzing and/or correcting images. In one example the method of analyzing images as described in relation to FIG. 1 is used in analyzing the images. In one example, the method for correcting images as disclosed in relation to FIG. 2 is used in correcting the images. In one example, methods for establishing point correspondence comprise any of the methods, known to those skilled in the art, like feature point matching, e.g. SIFT or SURF, or pixel based matching, e.g. correlation- or phase-based techniques, or more global methods, e.g. graph cuts or mean field methods.

Figure 5:
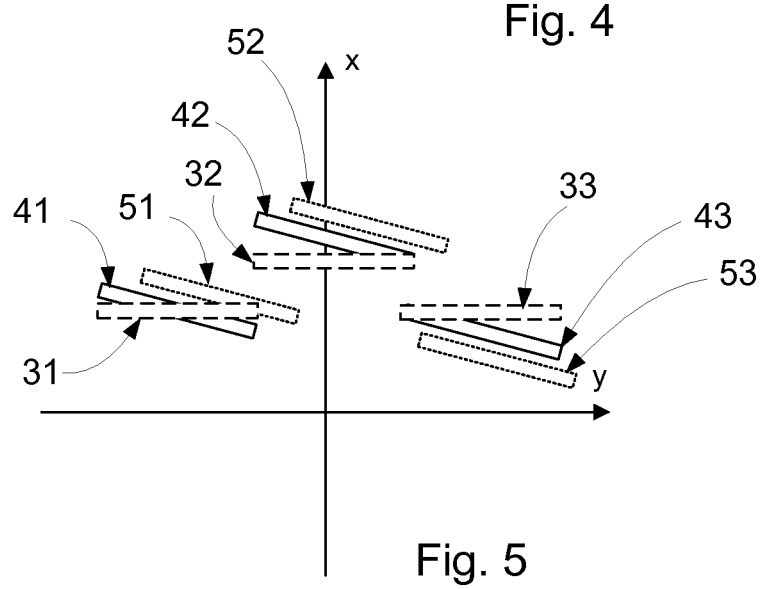
FIG. 5 illustrates schematically one example of a sensor arrangement on a satellite.

FIG. 5 is a schematic section of how staggered image sensors can be arranged on a satellite. For a better understanding only three sensors are shown, but it should be noted that it is well known by those skilled in the art that a staggered sensor array may comprise more than three sensors, which in general are arranged in two planes such that alternating one sensor is in one plane and the next sensor in the other plane. In one example, the two planes are arranged in relation to each other such that one side of sensors in one plane touches or is adjacent to another side of the sensors in the other plane. The displacement of the sensors in the y-direction of FIG. 5 is thus usually small in reality, but has exaggerated here for better explaining the principle. It is intended that the sensors are arranged as shown with the dashed lines, i.e. the sensors should be positioned as indicated by 31, 32 and 33. Due to different physical effects, for example stress, temperature changes, internal or external forces or any other physical effect, the position and/or orientation of the sensors can change. In one example, one or more of the sensors changes its orientation so that one or more the sensor is arranged at position 41, 42, and/or 43 as indicated by the continuous line in FIG. 5. In one example, one or more of the sensors has changed its position. In case both orientation and positions are changed one or more of the sensors might be at position 51, 52, and/or 53 as indicated by the dotted lines in FIG. 5. If a change in orientation and/or position of a sensor is unknown it will provide errors in an image where the sensor is used to provide that image. In practice, it usually results in that one or more parts of the images are shifted compared to where they should be. In one example the at least three images are provided from different satellites and the errors will thus not be the same in all images. Since the images are provided from different angles the errors will not be at exactly the same part of an image, even if they are provided from the same satellite. Since possible errors are on different parts of the images, establishing point correspondence for enough points will enable their discovery and correction. By analyzing images according to the method described in FIG. 1 it is possible to discover such errors. By performing the method described in FIG. 2 it is then possible to correct these kinds of errors.

Figure 6:
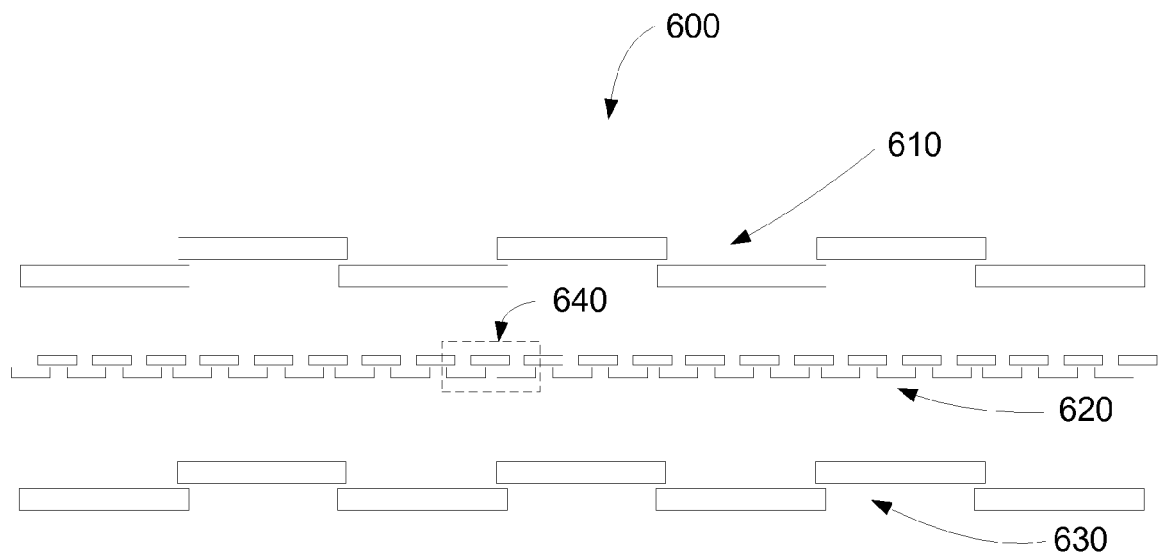

In FIG. 6 one example of a schematic view of a sensor arrangement 600 on a satellite is shown. The sensor arrangement comprises of three sensor rows 610, 620 and 630. The upper sensor row 610 comprises multispectral sensors, the middle sensor row 620 comprises panchromatic sensors, and the lower sensor row 630 comprises multispectral sensors. FIG. 5 is a detailed view of three sensor elements out of a section 640 of the sensor arrangement 600. It should be noted that FIG. 5 and FIG. 6 only are examples of satellite sensor arrangements and that the present invention is by no means limited to these examples.

Figure 7:
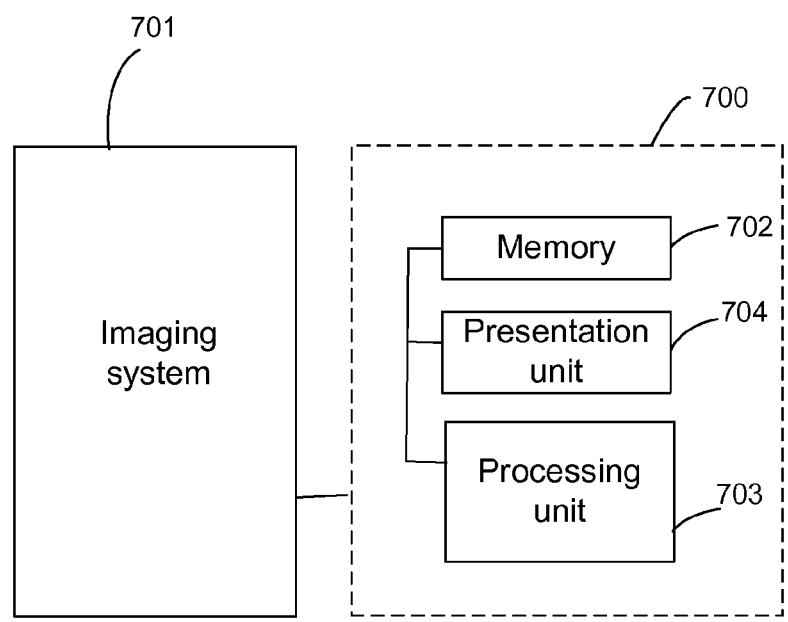
FIG. 7 shows a scheme of a system for analyzing images.

In FIG. 7, a system 700 for analyzing images generated from at least one imaging system 701 on at least one satellite comprises at least a memory 702 and a processing unit 703. The memory is arranged to store at least three images of an area of interest from the at least one imaging system 701. The at least three provided images are provided from at least three different angles. The processing unit is arranged to establish point correspondence between the at least three provided images. The processing unit is further arranged to generate at least two sets of three-dimensional information based on the at least three provided images. The at least two sets of three-dimensional information are then generated based on at least two different combinations of at least two of the at least three provided images of the area of interest. The processing unit 703 is further arranged to compare the at least two sets of three-dimensional information so as to determine discrepancies and providing information related to the imaging system and/or errors in the images based on the determined discrepancies.

In one example, the processing unit 703 is arranged to update the images of the memory 702 with the information related to the errors in the images in the memory. In one example, the provided information related to the imaging system is used for updating model parameters of a model of the imaging system. In one example, the processing unit is arranged to feed the provided information related to the imaging system 701 back to the imaging system.

The processing unit 703 comprises in one example a computer program comprising a program code for analyzing images from a satellite and/or for correcting images, as discussed above. Further, a computer program product comprises a program code stored on a computer readable media for analyzing images from a satellite and/or for correcting images, as discussed above.

Further, the provided information related to the imaging system and/or errors in the images is in one example presented on a presentation unit 704. The presentation unit 704 is for example a display.

In one example, the images of the memory 702 are used for developing a three dimensional model of an environment. The processing unit 703 is then arranged to, based on position and direction information related to the images in the memory 702, stereo image process an arbitrary number of at least partly overlapping image sets of the memory so as to provide the three dimensional model. In detail, the processing unit 702 is in one example arranged to find corresponding points in the at least partly overlapping images and to find disparity estimations based on the corresponding points so as to provide the stereo image processing. In one example, the processing unit 702 is arranged to, for each image to be stereo image processed, associate the position and direction information so that basically each pixel of each image is correlated to corresponding position and direction information. The stereo image processing is then performed based on the associated position and direction information so that all pixels in the 3D model are specified in three geographical dimensions. In one example, the presentation unit is arranged to present the 3D model.

The 3D model could be any kind of 3D model known to those skilled in the art. In one example, the 3D model is represented as a mesh. In an alternative example, the 3D model is represented as a surface representation. In an alternative example, the 3D model is represented as a voxel representation.

The memory 702 may also be arranged to store data related to the three-dimensional model calculated by the processing unit 703. The presentation unit 704 may be arranged to present a selected part of the 3D model. The arrangement 700 may also comprise input means (not shown) for selecting a part of the 3D model and the display is arranged to present information related to the selected part.

The system 700 for analyzing images may also comprise a transmitter (not shown) arranged to transmit the information related to the images and/or the 3D model to a receiver in a remote location. In one example, the transmitter at least partly provides a substitute for the memory 702 and/or the presentation unit 704. In an alternative example, the transmitter is provided in addition to the memory 702 and/or the presentation unit 704.

In one example, at least some of the components of the system 700 are situated at different places and connected in a network.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for analyzing and correcting images generated from at least one imaging system on at least one satellite, the method comprising the steps of:
   providing at least three images of an area of interest from the at least one imaging system, the at least three provided images being provided from at least three different angles and each of the images covering at least an entirety of the area of interest;
   establishing point correspondence between corresponding points in each of the at least three provided images, wherein the points for which point correspondence is established are present in each of the at least three provided images;
   generating at least two sets of three-dimensional information based on the at least three provided images, wherein the at least two sets of three-dimensional information are generated based on at least two different combinations of at least two of the at least three provided images of the area of interest, and wherein each of the at least two sets of three-dimensional information comprise three-dimensional coordinates for the points for which point correspondence has been established;
   comparing the at least two sets of three-dimensional information so as to determine discrepancies and provide information related to at least one of the imaging system or errors in the images based on the determined discrepancies, wherein comparing the at least two sets of three-dimensional information comprises comparing the three-dimensional coordinates in each of the at least two sets of three-dimensional information for at least one of the points for which point correspondence has been established;

building a model with at least one of internal or external parameters of said at least one imaging system, said model identifying how these parameters affect images provided by said at least one imaging system;

changing parameters corresponding to said at least one imaging system within the model based on the result of the analysis of possible differences between the at least two sets of three-dimensional information;

correcting at least one of the at least three provided images of the area of interest taken from said at least one imaging system according to the built model and the changed parameters, wherein correcting the at least one of the at least three provided images comprises correcting at least one of (a) raw data of the image, (b) at least one pixel of the image, or (c) both the raw data and the at least one pixel; and regenerating the at least two sets of three-dimensional information from the corrected at least three images, wherein the correction is performed so as to minimize any errors in the point correspondence between the at least three images and/or as to minimize the differences in the at least two generated sets of three-dimensional information.

2. A method according to claim 1, wherein at least the changing parameters, correcting, and regenerating steps of claim 1 are repeated until at least one of the errors in the point correspondence between the at least three images or the differences between the at least two generated sets of three-dimensional information are below a certain threshold.

3. A method according to claim 1, wherein at least the changing parameters, correcting, and regenerating steps of claim 1 are repeated until a certain number of iterations has been performed.

4. A method according to claim 1, wherein at least one of the parameters of said at least one imaging system is independent for every provided image.

5. A method according to claim 1, wherein at least one of the parameters of said at least one imaging system will take the same value for at least one of the provided images.

6. A method according to claim 1, wherein at least some of the provided images are provided from different satellites.

7. A method according to claim 1, wherein the at least two sets of three-dimensional information comprise three-dimensional areas.

8. A method according to claim 1, wherein the at least two sets of three-dimensional information comprise three-dimensional images.

9. A method according to claim 1, wherein the step of providing at least three images of an area of interest from the at least one imaging system comprises selecting a set of at least three images captured by means of the at least one imaging system.

10. A method according to claim 1, wherein the step of providing the at least three images includes at least image manipulation so as to arrive at the provided image.

11. A method for providing a three-dimensional image of an area of interest, said method comprising the steps of analyzing images generated from at least one imaging system on at least one satellite according to claim 1 and providing the three-dimensional image of the area of interest based on the images and based on the provided information related to the imaging system and/or errors in the images.

12. A method for generating a three-dimensional model of the environment, said method comprising the steps of:

analyzing images generated from at least one imaging system on at least one satellite according to claim 1;

providing at least two three-dimensional images of the area of interest, each of the at least two three-dimensional images of the area of interest being based on the images generated from the at least one imaging system and based on the provided information related to the imaging system and/or errors in the images; and combining the at least two three-dimensional images provided so as to generate the three-dimensional model of the environment.

13. A method according to claim 1, wherein the area of interest is defined by an overlapping intersection of the at least three images.

14. A method according to claim 1, further comprising: refining a three dimensional model of an environment based at least in part on the determined discrepancies and the provided information.

15. A non-transitory computer program product comprising at least one non-transitory computer-readable storage medium having computer-readable program code portions embodied therein, the computer-readable program code portions being configured for analyzing and correcting images generated from at least one imaging system on at least one satellite by executing the steps of:

providing at least three images of an area of interest from the at least one imaging system, the at least three provided images being provided from at least three different angles and each of the images covering at least an entirety of the area of interest;

establishing point correspondence between corresponding points in each of the at least three provided images, wherein the points for which point correspondence is established are present in each of the at least three provided images;

generating at least two sets of three-dimensional information based on the at least three provided images, wherein the at least two sets of three-dimensional information are generated based on at least two different combinations of at least two of the at least three provided images of the area of interest, and wherein each of the at least two sets of three-dimensional information comprise three-dimensional coordinates for the points for which point correspondence has been established;

comparing the at least two sets of three-dimensional information so as to determine discrepancies and provide information related to at least one of the imaging system or errors in the images based on the determined discrepancies, wherein comparing the at least two sets of three-dimensional information comprises comparing the three-dimensional coordinates in each of the at least two sets of three-dimensional information for at least one of the points for which point correspondence has been established;

building a model with at least one of internal or external parameters of said at least one imaging system, said model identifying how these parameters affect images provided by said at least one imaging system;

changing parameters corresponding to said at least one imaging system within the model based on the result of the analysis of possible differences between the at least two sets of three-dimensional information;

correcting at least one of the at least three provided images of the area of interest taken from said at least one imaging system according to the built model and the changed parameters, wherein correcting the at least one of the at least three provided images comprises correcting at least one of (a) meta data connected to the image, (b) raw data of the image, (c) at least one pixel of the image, or (d) a combination of at least two selected from the group comprising the meta data, the raw data, and at least one pixel; and regenerating the at least two sets of three-dimensional information from the corrected at least three images, wherein the correction is performed so as to minimize any errors in the point correspondence between the at least three images and/or as to minimize the differences in the at least two generated sets of three-dimensional information.

16. A system for analyzing and correcting images generated from at least one imaging system on at least one satellite, said system comprising:

one or more memory storage areas configured to store at least three images of an area of interest from the at least one imaging system, the at least three provided images being provided from at least three different angles and each of the images covering at least an entirety of the area of interest; and one or more computer processors configured to:
establish point correspondence between corresponding points in each of the at least three provided images, wherein the points for which point correspondence is established are present in each of the at least three provided images;

generate at least two sets of three-dimensional information based on the at least three provided images, wherein the at least two sets of three-dimensional information are generated based on at least two different combinations of at least two of the at least three provided images of the area of interest, and wherein each of the at least two sets of three-dimensional information comprise three-dimensional coordinates for the points for which point correspondence has been established; and compare the at least two sets of three-dimensional information so as to determine discrepancies and provide information related to at least one of the imaging system or errors in the images based on the determined discrepancies, wherein comparing the at least two sets of three-dimensional information comprises comparing the three-dimensional coordinates in each of the at least two sets of three-dimensional information for at least one of the points for which point correspondence has been established;

build a model with at least one of internal or external parameters of said at least one imaging system, said model identifying how these parameters affect images provided by said at least one imaging system;

change parameters corresponding to said at least one imaging system within the model based on the result of the analysis of possible differences between the at least two sets of three-dimensional information;

correct at least one of the at least three provided images of the area of interest taken from said at least one imaging system according to the built model and the changed parameters, wherein correcting the at least one of the at least three provided images comprises correcting at least one of (a) meta data connected to the image, (b) raw data of the image, (c) at least one pixel of the image, or (d) a combination of at least two selected from the group comprising the meta data, the raw data, and at least one pixel; and regenerate the at least two sets of three-dimensional information from the corrected at least three images, wherein the correction is performed so as to minimize any errors in the point correspondence between the at least three images and/or as to minimize the differences in the at least two generated sets of three-dimensional information.

* * * * *